J. F. SEIBERLING.
Harvesters.

No. 137,490　　　　　　　　　　Patented April 1, 1873.

Witnesses:-　　　　　　　　Inventor:-
W. H. Rowe,　　　　　　　　John F. Seiberling
Joe Peyton　　　　　　　　　by his Atty
　　　　　　　　　　　　　　W. D. Baldwin

UNITED STATES PATENT OFFICE.

JOHN F. SEIBERLING, OF AKRON, OHIO, ASSIGNOR TO CLIMAX MOWER AND REAPER COMPANY, OF CORRY, PENNSYLVANIA.

IMPROVEMENT IN HARVESTERS.

Specification forming part of Letters Patent No. 137,490, dated April 1, 1873; application filed April 5, 1872.

*To all whom it may concern:*

Be it known that I, JOHN F. SEIBERLING, of Akron, in the county of Summit and State of Ohio, have invented a certain new and useful Improvement in Harvesters, of which the following is a specification:

My invention relates to the gearing of the harvester. Its object is to vary the speed of the cutters; and the improvement consists in combining a shaft revolving in bearings in the frame; a sleeve moving freely endwise on said shaft and turning therewith; a shipping-lever for sliding said sleeve; independent concentric bevel-wheels revolving freely either on the shaft and sleeve or both on the sleeve, but prevented from moving laterally; and a locking-pin or equivalent device on the sleeve, which pin alternately engages with a ratchet on one or the other of the wheels which drive pinions on the crank-shaft, thus varying the speed of the cutters. Any style of gearing can be used in connection with the sleeve; but in this instance I use bevel-gearing. This device constitutes an improvement on my patent of August 1, 1871, in which the shaft itself slides.

Figure 1:
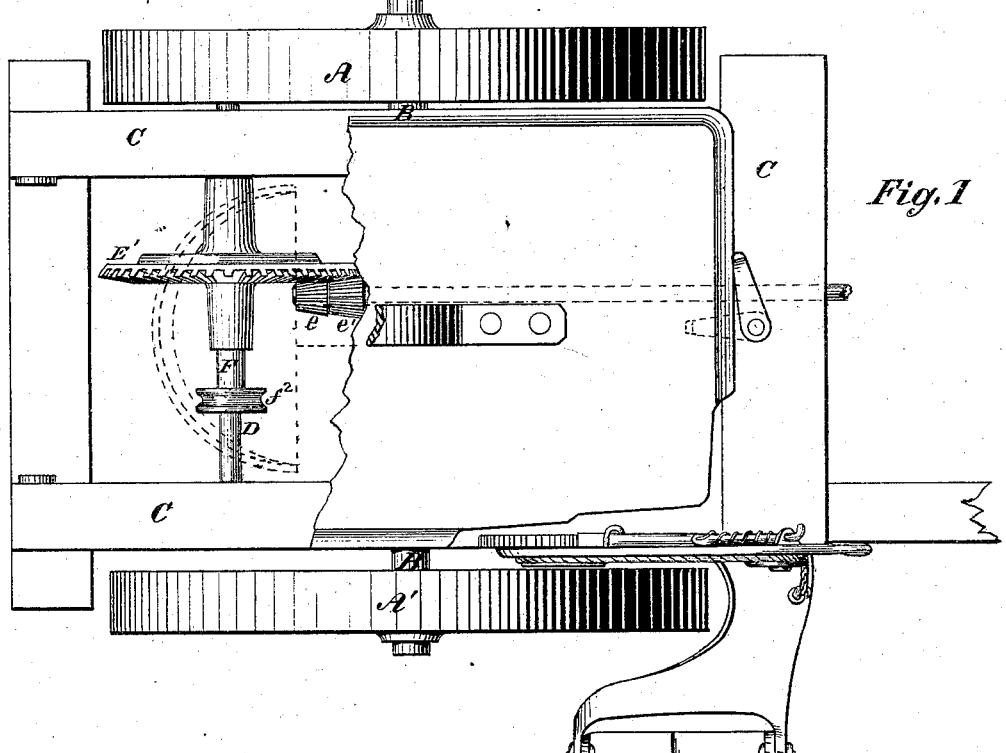
Figure 2:
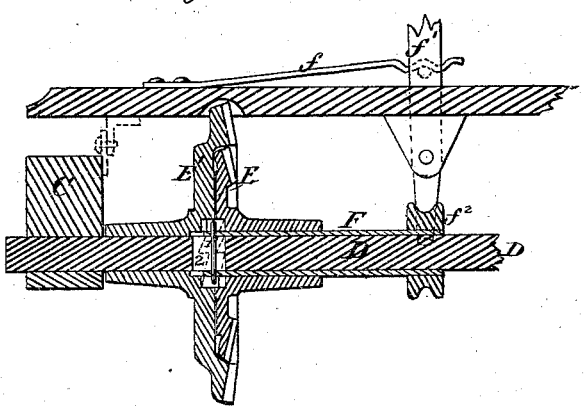

In the accompanying drawing, Figure 1 is a plan view of so much of a harvester as is necessary to show my improvements; Fig. 2, a vertical longitudinal section through the counter-shafts upon an enlarged scale; and Fig. 3, a perspective view of a modification of the counter-shaft and sleeve.

Driving-wheels A A', mounted on an axle, B, support a main frame, C. The counter-shaft D is driven from the main axle or driving-wheels by well-known gearing. The cutters are driven in the usual way, by a crank and pitman from a crank-shaft carrying two bevel-pinions, $e$ $e'$, fast thereon. These pinions, respectively, mesh with two concentric bevel-gears, E E', arranged in the same vertical plane, but revolving independently of each other. The larger pinion E', in this instance, turns freely on the counter-shaft D, the shoulder of its sleeve bearing against the frame or a suitable bearing to resist the lateral thrust of the gearing and to prevent the gear from moving endwise. The smaller gear E turns freely on a sleeve, F, on the counter-shaft, and is prevented from moving endwise on the shaft in the same manner as the larger gear. The sleeve F turns with, but slides freely endwise on, the counter-shaft, to which it is locked by a cross-pin, 1, which passes through a long slot, 2, in the counter-shaft, and projects beyond the periphery of the sleeve on each side. This pin slides in a cavity between the two gears E E', locking alternately with ratchets or feathers on the inner face of either gear to cause it to turn with the counter-shaft, and thus drive the crank-shaft with varying speed. A shipping-lever, $f^1$, pivoted on the main frame, acts on a grooved pulley, $f^2$, on the sliding-sleeve F, and thus throws the mechanism into or out of gear. A spring, $f$, on the frame is provided with three notches or corrugations, in one of which a pin on the shipping-lever takes. When this pin is in the central groove it holds the pin 1 intermediately between the two bevel-gears E E', and thus stops the cutters; when it is shifted to one of the outer notches the corresponding bevel-gear is held in gear.

This mode of changing the speed I prefer to the one shown in my patent of August 1, 1871, hereinbefore mentioned, as it obviates the necessity of sliding the counter-shaft itself, which exists in the machine described in that patent.

Figure 3:
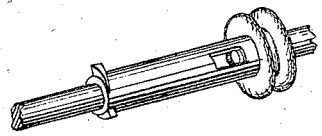

Instead of slotting the counter-shaft and securing the pin to the sleeve, the sleeve may be slotted and the pin or clutch attached to the counter-shaft, as shown in Fig. 3, and by this means greater strength of the counter-shaft is secured.

My improvements are to be applied to a fully-organized harvesting machine, a detailed description of which is unnecessary.

I claim as my invention—

The combination of a shaft, a sleeve movable endwise on the shaft and revolving therewith, two gear-wheels, one revolving on the sleeve, a clutch on the sleeve between the wheels, ratchets on the wheels, and a shipping-lever arranged to move the sleeve endwise on the shaft to engage and disengage the clutch with the wheels for varying the speed of the cutters, substantially as described.

In testimony whereof I have hereunto subscribed my name.

JOHN F. SEIBERLING.

Witnesses:
ALDEN GAGE,
R. J. WINTERS.